United States Patent Office 3,069,653
Patented Dec. 18, 1962

3,069,653
APPARATUS FOR DETECTING CHARACTERISTIC MARKINGS
Gerhard Hirschfeld, Berlin, Werner Hinz, Berlin-Neukolln, and Hanspeter Fritzsche, Berlin-Friedenau, Germany, assignors to International Standard Electric Corporation, New York, N.Y., a corporation of Delaware
Filed Apr. 4, 1958, Ser. No. 726,475
Claims priority, application Germany Apr. 26, 1957
2 Claims. (Cl. 340—146.3)

This invention covers the improvements in or relating to apparatus for detecting characteristic markings on articles in material-handling systems and, more particularly, to an electronic circuit for detecting a distinctive marking on an article and to control further operations in accordance therewith.

In the article-sorting art it is known to control the destination of each article in response to a characteristic marking thereon. Such marking may be a graphic marking or may be a magnetic marking. In the case of graphic marking, the mark may be sensed by photo-electric means, and in the case of a magnetic marking, the mark may be sensed by a suitable read head. The article must be scanned to detect the characteristic marking thereon. In letter-sorting systems the letter envelope must be tested for the existence of a postage stamp thereon and the light value reflected from the stamp must be evaluated and caused to control further sorting operations, as required. Many letter envelopes have additional markings which will also be detected by the stamp-sensing means and one of the purposes of this invention is to guard against the possibility that such extraneous markings will cause the sorting machine to be operated as if a stamp had been detected. The apparatus must also be enabled to distinguish between the reflecting value of the stamp and the reflecting value of the background of the letter envelope.

The invention concerns a method by which a characteristic mark affixed to an article can be detected by a photo-electric device which may measure the brightness-differences derived from a spot of light emanating from a light source and reflected by a portion of the surface of the article, the spot illuminating the mark to be ascertained and distinguishing it from other extraneous marks on the article, thereby to prevent a spurious control action from being exercised by said extraneous marks. According to a feature of the invention, electric pulses are produced from a photo-electric scanning device and which pulses are applied to a filter in one path and in a parallel path are obtained directly from the photoelectric device, conducted to a gate circuit which can be opened only when both types of pulses arrive at it simultaneously, the gate remaining blocked unless such simultaneous pulse arrival is achieved.

It is another object of the invention to derive an output signal from the scanning device over a differentiating circuit and applying the differentiated output to an amplitude-measuring circuit, and when the output exceeds a certain predetermined value, to apply such output to a gate circuit which will be blocked thereby.

It is yet a further object of the invention to suppress the decaying transients derived from each intergration so that evaluation may not be accomplished until the mean value of the voltage, which is to be determined by the integrator, has been reached.

The characteristic mark on an article which is generally transported past the scanning device is scanned or tested by a light-sensitive device such as a photo-electric cell, and which is covered by a mask having a narrow slit therein. The slit is about equal in width to the characteristic mark which the photo-electric device is called upon to detect, but is narrow in width compared to the length of the article to be scanned. Since, however, the slit cannot be infinitely small, its size will be such as to match a certain area of the article to be scanned so that a sudden variation of the light-reflecting characteristics of the article being scanned will cause a gradually changing brightness-value to be derived. Accordingly, the leading and trailing edges of the output curve of the light-sensitive device will be similarly slow.

When the characteristic mark is scanned, the light-sensitive device produces a signal which is then applied to an integrator such as a low-pass filter and the signal is thereby smoothed. The output of the integrator is applied to an amplitude filter called a "remission filter," wherein and through which none but those signals are passed whose amplitudes remain within predetermined limits. The voltages derived from the output of the remission filter are applied then to a differentiating circuit and these pulses are used to initiate further control actions.

In order that only those markings will be detected which cause a sudden variation of output from the photo-electric device and which output is within certain limits, pulses are derived from the signals before being applied to the integrator. These pulses and those derived from the remission filter are applied to a gate circuit which operates only if the pulses from these two paths arrive at the gate simultaneously. Such simultaneous arrival causes the gate to open and a control signal to be derived therefrom.

A second possibility of practising the invention lies in conducting the signal derived from the output of the integrator to the remission filter and to a differentiating circuit. If the filter finds the signal to be within the predetermined limits, with respect to its amplitude, and the differentiated signal does not exceed a certain value, the gate circuit connected to the filter and differentiating circuits will be opened and a control signal likewise derived therefrom.

The above-mentioned and other features and objects of this invention will become apparent by reference to the following description taken in conjunction with the accompanying drawings, wherein.

Figure 1:
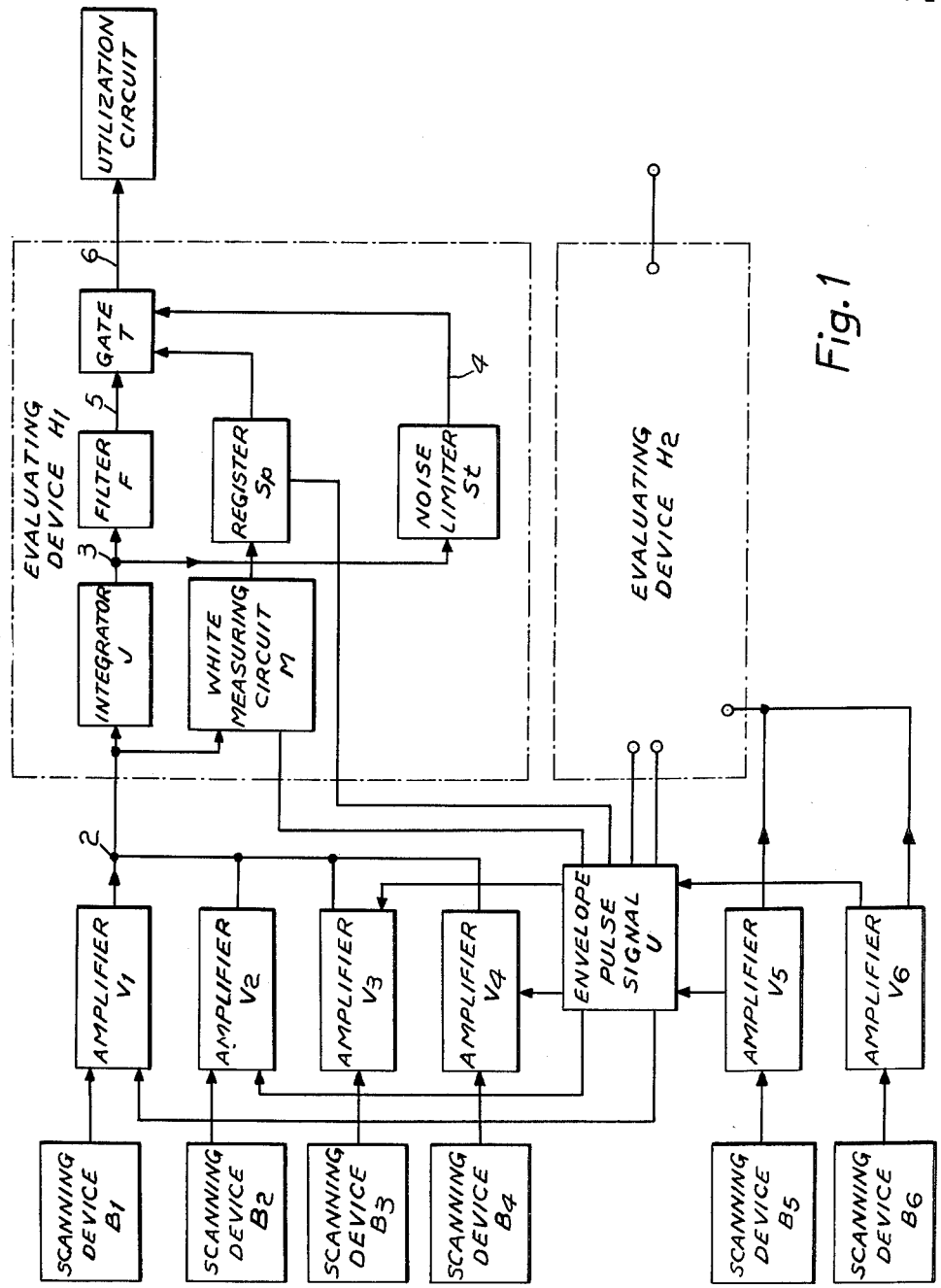
FIG. 1 is a block diagram showing the inventive circuit.

Referring now to FIG. 1, there is shown in block diagram a plurality of scanning devices B1 . . . B6 and which may be photocells or any other suitable photo-sensitive detectors. The output of each of the elements B1 . . . B6 is applied to one input of its associated amplifier V1 . . . V6. The amplifiers V1 . . . V4 have another input derived from a switched control device U which indicates the presence of an envelope of acceptable size, a pre-determined condition established by means not included in the present invention, and which device is controlled by the output of amplifiers V5, V6. Thus, for amplifier V1 to be effective, it must simultaneously receive an input pulse from its associated photocell B1 and a pulse from the device U. The output of the amplifiers V1 . . . V4 is joined at point 2, and applied to the evaluating device H1. Another output of amplifiers V5, V6 is joined and is applied to the evaluating device H2. The elements B5, B6 scan different portions of the article being sensed and from which a separate control voltage is obtained for reasons as explained above, are preliminary and unrelated to the invention. They may serve to evaluate the physical parameters of the article being scanned to determine whether it will be subjected to scrutiny by photocells B1 . . . B4. The device U delivers output pulses only when excited by amplifiers V5, V6. The details of the device are disclosed in applicants' copending application Ser. No. 726,405 entitled "Article Sorting Control Apparatus." These are shown particularly in FIGS. 1 and 3 thereof. Within the evaluating device H1, the input derived from the amplifiers V1 . . . V4 is branched into parallel paths. One path, the lower one, is led to the element M which constitutes a "white-measuring" circuit. The upper path is applied to the integrator J. The output of the integrator J is split into two parallel branches at point 3, the upper one of which is applied to the filter F and the lower one is applied to a noise limiter St. The output of filter F is applied to one input of a three-input gate T at point 5. The output of the circuit M is applied through the register Sp to a second input of the gate T. The output of limiter St is applied to the third input of gate T.

The output of the gate T is shown at point 6 is applied to a utilization circuit. The details of the utilization circuit are not disclosed since they are well known to those skilled in the art. This circuit, for example, would include a switch in a sorting machine for energizing the necessary control to separate the letters having stamps from those not having stamps.

The gate T is adapted to be opened upon the coincidence of voltages applied to its three inputs derived respectively from filter F, register Sp and limiter St.

Register Sp is a well known flip-flop or bistable multivibrator and has a reset input coupled to the device U. The output of this register is connected to the gate and performs a switching operation in accordance with the pulse amplitude applied by circuit M.

Limiter St acts to differentiate the signal detected by integrator J and thereby produces positive voltage peaks in the case of ascending flanks of voltage curves and negative peaks in the case of descending flanks of such curves. Limiter St also acts to reverse polarity of applied pulses.

Figure 2:
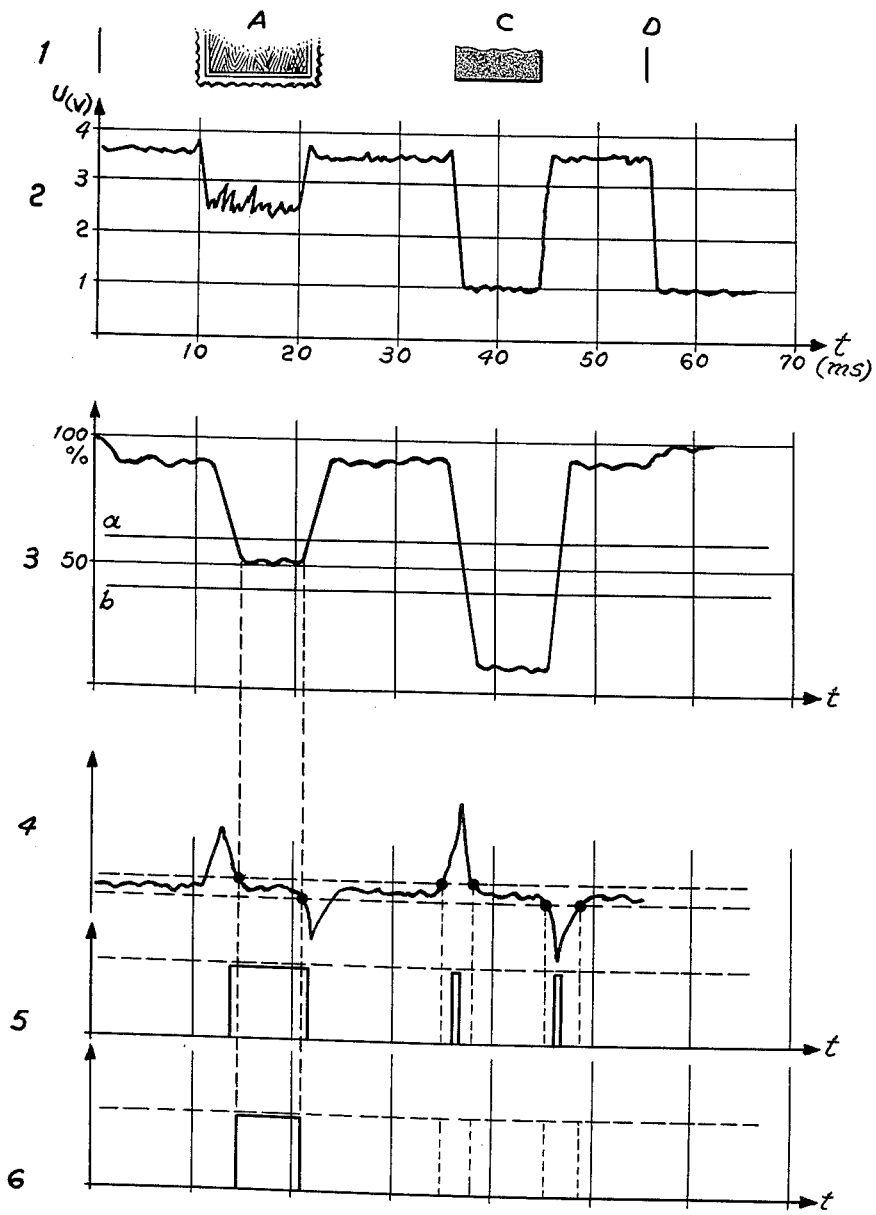
FIG. 2 is a series of curves showing the voltage relationships at various points in FIG. 1.

In FIG. 2 there is shown at 1, a portion of a letter envelope having a postage stamp A thereon and an extraneous mark C spaced a distance from the stamp. The line D marks the edge of the envelope. Let it be assumed that the envelope is to be scanned from the left towards the right side thereof. An amplifier from V1 . . . V4, of FIG. 1 will deliver output voltages as shown in curve 2 wherein the abscissa is scaled in milliseconds and the ordinate is scaled in voltages. The background portions of the envelope 1 produces a voltage that is upwards of 3 volts. The stamp A having a lesser reflecting surface than the envelope produces a decreased voltage over that produced by the background of the envelope, and the extraneous mark C produces a still lower voltage since its reflecting power is less than either the envelope background or the stamp. After the envelope 1 passes the scanning device B at its edge D, the output voltage again decreases to a value comparable to the value of the voltage caused by the extraneous mark C. The waveforms of the voltages shown in curve 2 are applied to the integrating element J, shown in FIG. 1. This integration is applied to a filter which has upper and lower threshold limits $a$, $b$, as shown in curve 3. It will be seen from curve 3, that the voltages of curve 2 appear delayed in time and the rapid signal variations are flattened out to give a mean signal value. It will be further observed that the voltage created by the stamp has its maximum value within the limits $a$, $b$, but the voltage derived from the extraneous mark C will be seen to exceed the limits of the filter. As shown in curve 4, the edges of the waveforms of curve 3 are differentiated by means of the noise limiter St. These pulses and those illustrated in curve 5 are jointly applied to the gate T and act to block this gate for an interval of time during which the square pulses in curve 3 exceed a certain value. As will be understood, the rectangular pulse produced by the stamp A will be somewhat narrowed as shown in curve 6 which represents the output of the gate T, but the pulses produced by the extraneous mark C shown in curve 5 will be produced during the shorter time required by the pulse in curve 3, caused by the mark C, to pass from the upper limit $a$ to the lower limit $b$ and, later, to return across such limits. Thus, the duration of these short pulses in curve 5 corresponds to the difference in time between the excess of the lower threshold value and that of the upper value of the filter. These short square-wave pulses fall within the blocking region provided by the differentiated voltage illustrated in curve 4 and will therefore be suppressed and not appear at the output of gate T. Waveform 5 appears at the output of amplitude limiting filter F. Outputs are derived for amplitudes between the limits $a$ and $b$ previously mentioned.

Figure 3:
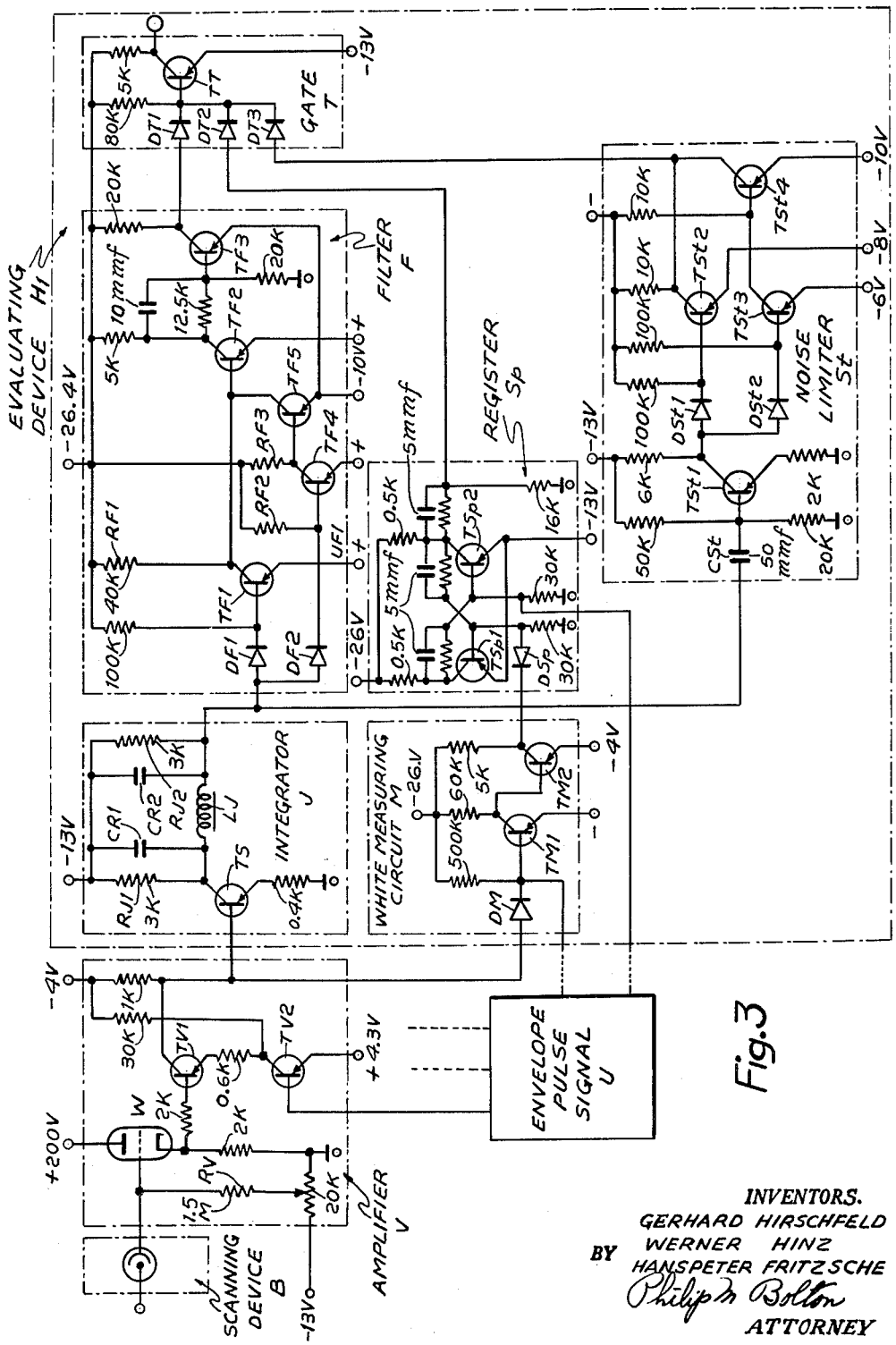
FIG. 3 is a schematic diagram of the inventive circuit shown in block form in FIG. 1.

FIG. 3 shows the detailed circuitry of the elements shown in FIG. 1. B denotes one of the photocells B1 . . . B4 and V denotes one of the amplifiers V1 . . . V4 associated therewith. The output of photocell B appears across resistor $R_v$ and the voltage thereacross corresponds to the brightness value of the scanning signal. Amplifier W is a cathode follower whose output is applied to the base electrode of transistor TV1, which transistor amplifies the output voltage and applies it to integrator J, via its collector electorde. Transistor TV1 is controlled by transistor TV2, which, in turn, is controlled by device U. Integrator J also comprises a transistor TS whose base electrode is coupled to the collector electrode of transistor TV1. Resistors RJ1, RJ2, condenser CR1, CR2 and inductance LJ constitute a low-pass filter and integrating stage and are coupled to the collector electrode of transsistor TS. The output of the stage J is applied to the amplitude-limiting filter F via the rectifier DF1. Filter F consists of transistor TF1 having its base electrode coupled to the rectifier DF1 and having its collector electrode connected to a source of negative potential via biasing resistor RF1. The emitter of transistor TF1 is connected to a source of positive potential UFI. The bias of transsistor TF1 is such that it normally conducts, and a voltage drop is derived across the resistor RF1. The positive potential on the collector side of resistor RF1 is applied in parallel to the base electrode of transistor TF2 and the collector electrode of transistor TF5 respectively. Since all these transistors are of the p-n-p-type, they require negative potential to be applied to the base and collector electrodes relative to their emitter electrodes in order to render them conducting. The transistor TF4 has its base electrode coupled to the output of the low-pass filter J via the rectifier DF2 and it normally conduits. Its biasing resistor RF3 maintains a positive potential on the base electrode of transistor TF5 maintaining the latter transistor in non-conducting condition. The value of the bias across resistor RF3 is considerably greater than that of the resistor RF1 so that transistor TF4 will tend to be cut off by the positive pulse derived from the low-pass filter J at a level corresponding to the level $a$ in curve 3, FIG. 2. The transistor TF1 is biased so that it will not cut off until the input pulse reaches a value defined by line $b$ in said curve. The cut-off of transistor TF4 will normally trigger transistor TF5 and this, in turn, will cause transistor TF5 to conduct. If, however, the positive voltage derived from the low-pass filter is in excess of that derived from the scanning of the stamp, then the transistor TF1 will be cut off and the full negative potential will be applied to the base electrode of transistor TF2 causing it to conduct.

Gate T, which furnishes the output signal, comprises three diodes DT1, DT2, DT3, and a transistor TT as the main elements. The signal to be produced by a postage stamp existing on a letter envelope is produced if transsistor TT is conducting. Such is the case whenever all the three diodes have been blocked.

Diode DT1 receives the control signal for it as soon as the photocell B and device U act conjointly on amplifier V over integrator J and filter F.

Diode DT2 receives the control signal for it as soon as the photocell B and device U act conjointly on amplifier V over the white-value measuring circuit M wihch is at the same time affected by device U and delivers its output over register Sp to diode DT2.

Similarly to the diodes DT1, DT2, diode DT3 is controlled by the output of V over integrator J, but thence over the noise-pulse blanking circuit or noise limiter St.

There are six states requiring consideration.

With the first state no letter is at the scanning device, so the plant is at rest.

The second state arises as soon as a white letter envelope comes to face the test device.

The third state is brought about by a black spot coming to face the photocell B.

The fourth state deals with the transistion from a white letter envelope to the grey spot, and vice versa.

The fifth state is that in which the postage stamp is directly in front of the scanning device.

The sixth state is that in which a black spot on a white background is scanned without, however, initiating an output signal.

I. At-Rest State

The photocell B is not excited. Device U blocks the switching transistor TV2 which in turn blocks TV1. Accordingly transistor TS is conducting and its output appears over rectifier DF1 to block the transistor TF1. Over the conducting diode DF2 transistor TF4 is blocked, whereby TF5 will be rendered conducting and TF2 will be blocked. TF3 consequently becomes conducting and thus causes DT1 likewise to be conducting.

Device U also blocks the transistor TM1. Thereby TM2 becomes conducting and transistor TSp1 of register Sp is blocked over DSp, so TSp2 will be conducting and hence DT2 too. As the output singal of J does not undergo any change, no signal can appear at the input of St, namely at the base of transistor TSt1. The meaning of this is that TSt1 is carrying a normally closed circuit current. A suitable bias of the emitters insures that in this case TSt2 will be blocked while TSt3 will be conducting and TSt4 likewise be blocked. Since TSt2 and TSt4 are joined in parallel and both blocked, diode DT3 is blocked too. But this diode can not affect the transistor TT because the diodes DT1, DT2 are conducting.

II. A White Letter Is Being Scanned

The photocell B is current-carrying. Device U is caused to operate by amplifiers V5, V6 and causes the switching transistor TV2 to be conducting. The current passed by transistor TV1 is small. Transistor TS decreases in conductivity. Despite this behavior the transistors TF1-TF5 remain at rest as stated under I.

But the device U also acts to annul the blocking of transistor TM1. This becomes conducting because the diode DM is blocked by the output of transistor TV1. Thereby transistor TM2 is blocked too and transistor TSp1 is, over DSp rendered conductive. The result is that the transistor TSp2 remains blocked until the scanning operation effected at this time has been finished. Thus, diode DT2 will likewise be blocked, whereby one of the requirements for the output transistor TT becoming conductive has been satisfied.

But despite this state, the elements of arrangement St have not yet been affected, so they are still at rest since at the input of St no voltage variation occurs, there having been no output derived from intergrator J.

III. A Dark Spot Appears in Front of Photocell B

Photocell B is almost completely blocked by the dark spot, so the current passed by tube W is very small. By device U the switching transistor TV2 is rendered conducting. TV1 increases in conductivity, the current in tube W being now less than it was before. The current in transistor TS likewise lessens whereby DF1 will be blocked and TF1 caused to conduct. DF2 is blocked to and causes TF4 to conduct whereby TF5 will likewise be blocked. Transistor TF1, now conducting, causes potential to be applied to TF2, so TF3 and thus the diode DT1 will be conducting. However, as herebefore stated under I, this diode DT1 can not affect the transistor TT. But under the control of transistor TV1 the diode DM will and thus block the transistor TM1 thereby precluding an output of register Sp and conduction of diode DT2. The other elements of M and St remain at rest.

IV. The Scanning Changes From the Letter Envelope to the Postage Stamp (a) *Transition from White to Grey.*—Whenever the output signal of J is changed, the differentiation member containing the condenser CSt acts to apply a negative pulse to transistor TSt1. Accordingly the current in this transistor increases momentarily. Diode DSt2 will hence be conducting to block the transistor TSt3. Diode DSt1 will likewise be conducting to block the transistor TSt2. The blocked transistor TSt3 causes transistor TSt4 and hence the diode DT3 to be conducting. Thus, for the duration of the pulse arising at condenser CSt, that is, for the duration of the scansion changing from white to grey, transistor TT will be blocked to delay the commencement of the output signal.

(b) *Transition from Grey to White.*—But at the end of the output signal an acceleration occurs as at this moment a positive pulse arises at condenser CSt, and this pulse causes the current in transistor TSt1 to lessen. TSt2 and TSt3 will thus be conducting and TSt4 will be blocked. Also, for the duration of that pulse the diode DT3 will be conducting to block the transistor TT.

V. A Postage Stamp Is Being Scanned

The photocell B carries current of a mean value, TV2 is caused by the device U to conduct, TV1 and hence TS carry current likewise of a mean value, TF1 will be blocked, TF4 will conduct as will also TF5, while TF2 and TF3 will be blocked. Since at condenser CSt the pulse caused by the transition has decayed, the diode DT3 is now blocked and thus satisfies one of the conditions for releasing the output transistor TT. As TF3 and consequently also DT1 have been blocked, the second release condition for TT is likewise fulfilled. Now, however, also TM1 will be conducting, TM2 will be blocked and TSp2 will be blocked so that DT2 is blocked too. Thus, the third release condition for TT has been satisfied, whereby transistor TT is brought to apply a signal to a suitable control mechanism.

VI. A Dark Spot Representing No Postage Stamp Is Being Scanned

The white background causes register Sp to block the diode DT2 (see under II). In consequence of the retardation effected by integrator J, the arrangement F produces a short output signal to block DT1 momentarily. But the arrangement F is to prevent transistor TT from being opened since no stamp is now on the letter envelope. This action is attained as follows: During the transition from white to black, and vice versa, according to the states IVa and IVb herebefore described, TSt4 is rendered conducting by the variation at the input of St, whereby DT3 will be likewise be conducting and transistor TT hence will be blocked independently of the states of the diodes DT1, DT2.

It is to be understood that the invention is not restricted in scope to the embodiment thereof here disclosed but that changes may be made within the scope indicated by the appended claims.

What is claimed is:

1. Apparatus for detecting characteristic markings on an article comprising photoelectric mark detecting means adapted to scan said article, said detecting means adapted to undergo electric change upon detection of marks, switch utilization means, a plurality of unidirectional control elements coupled to said switch utilization means for controlling operation thereof, the coupling of said elements being such that coincident operation thereof is required to cause operation of said switch utilization means, electric signal integrating circuit means and first signal amplitude filter circuit means serially connected intermediate said photoelectric detecting means and a first one of said unidirectional control elements, second signal amplitude filter circuit means coupled intermediate said photoelectric detecting means and another one of said unidirectional control elements, and signal limiting means intermediate said integrating circuit means and a third one of said unidirectional control elements, said integrating means adapted to furnish a mean signal value to said first filter means and said limiting means, said second filter means adapted to pass signals exceeding a predetermined value, whereby to cause operation of said switch utilization means upon detection of a mark of predetermined parameters only.

2. Apparatus as claimed in claim 1, wherein said signal limiting means comprises a differentiating circuit, said circuit adapted to invert the pulses obtained thereby.

References Cited in the file of this patent

UNITED STATES PATENTS

| | | |
|---|---|---|
| 2,615,127 | Edwards | Oct. 21, 1952 |
| 2,731,621 | Sontheimer | Jan. 17, 1956 |
| 2,785,388 | McWhirter et al. | Mar. 12, 1957 |
| 2,794,974 | Bagno et al. | June 4, 1957 |
| 2,843,837 | Thaler et al | July 15, 1958 |
| 2,925,586 | Levy | Feb. 16, 1960 |
| 2,985,366 | Scarrott | May 23, 1961 |

OTHER REFERENCES

Diode Coincident and Mixing Circuits in Digital Computors, by Tung Chang Chen, Proceedings of IRE, May 1950, vol. 38, Issue 5, pages 511–514.